May 14, 1963            A. F. MILLIKAN            3,089,829
SEPARATION OF M-XYLENE AND P-XYLENE BY DISTILLATION
IN THE PRESENCE OF BENZYL ALCOHOL
Filed Oct. 30, 1959
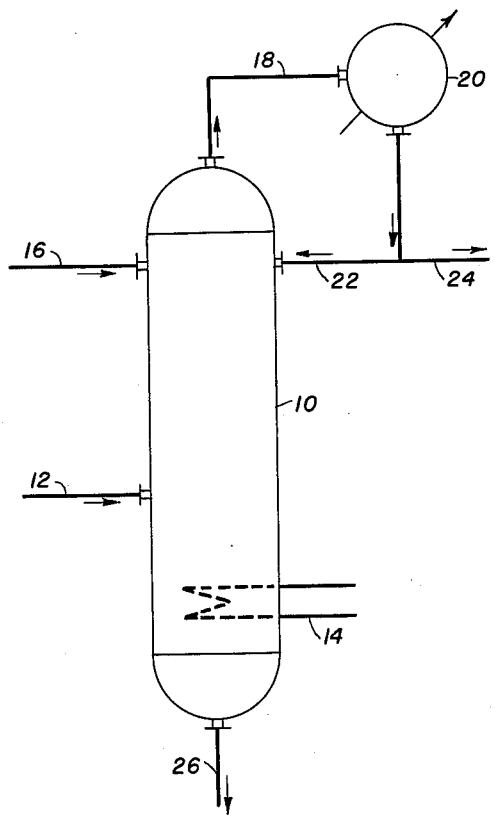
INVENTOR.
ALLEN F. MILLIKAN
BY
ATTORNEY.

United States Patent Office 3,089,829
Patented May 14, 1963

3,089,829
SEPARATION OF m-XYLENE AND p-XYLENE BY DISTILLATION IN THE PRESENCE OF BENZYL ALCOHOL
Allen F. Millikan, Crystal Lake, Ill., assignor to The Pure Oil Company, Chicago, Ill., a corporation of Ohio
Filed Oct. 30, 1959, Ser. No. 849,769
11 Claims. (Cl. 202—39.5)

This invention relates to a method of separating xylene isomers, and is based on the discovery that a mixture containing m-xylene and p-xylene can be separated by distillation in the presence of benzyl alcohol whereby the p-xylene is carried over as a relatively rich initial fraction or fractions, a m-xylene and p-xylene mixture rich in m-xylene comes over as the intermediate fraction or fractions, and practically pure benzyl alcohol is left as a residue for re-use.

There are many processes available for separating the xylenes from each other; however, distillation techniques have never been successful or practical for these types of hydrocarbons. As a result, fractional crystallization, a comparatively costly process, has been relied upon in the industry to produce the para-xylene necessary for the chemical industry. One important use of p-xylene is the production of terephthalic acid used in the manufacture of synthetic fibers. The p-xylene must be relatively pure for this purpose and the instant process yields p-xylene that is more than sufficiently pure for this purpose.

The main reason that fractional distillation is practically impossible as a method of separation of xylenes is that p-xylene boils at 138.4° C. and m-xylene has a boiling point of 139.1° C. However, their respective melting points, namely 13.3° C. and −47.9° C., allow fractional crystallization techniques to be applied. Crystallization processes are quite costly and often require some kind of preliminary purification before they will function properly. The instant process ties in with the present fractional crystallization techniques in that it may be used as a preliminary purification step to prepare or separate preconcentrated fractions which are readily amenable to fractional crystallization. This results in a cost reduction and increase in efficiency of the overall process. It also permits concentration of the p-xylene from the eutectic mixture comprising about 89% by volume of m-xylene and 11% p-xylene, freezing point −58.5° C., obtained in the fractional crystallization, which concentrated fraction can be recycled to the crystallization step and thus further increase the efficiency.

It becomes therefore a primary object of this invention to provide a process for purifying p-xylene and m-xylene.

An object of this invention is to provide a process for separating p-xylene from m-xylene and homologous mixtures.

An object of this invention is to provide a process of separating p-xylene from m-xylene by fractional distillation in the presence of benzyl alcohol.

Another object of this invention is to provide a process of separating and purifying p-xylene from admixture with isomers thereof which comprises distilling said mixtures in the presence of benzyl alcohol and subjecting selected fractions to fractional crystallization.

These and other objects of this invention will be described or become apparent as the specification proceeds.

The invention is illustrated by the following specific examples.

EXAMPLE I

A mixture of 25% v. p-xylene, 25% v. m-xylene, and 50% v. benzyl alcohol (B.P. 205.8° C.) was fractionally distilled in a 10-plate column at 30 mm. absolute pressure. Selected fractions were analyzed by infrared spectrometry, with the following results:

Table I

| | Percent of Xylenes Mixture Charged (Benzyl alcohol-free basis) | Percent p-xylene | Percent m-xylene |
|---|---|---|---|
| Cut #1 | 0–10 | 64.2±1.3 | 35.1±0.5 |
| Cut #3 | 20–30 | 63.5±1.0 | 36.6±0.5 |

EXAMPLE II

A mixture of 50% v. p-xylene and 50% v. m-xylene was fractionally distilled in a ten-plate column, at 30 mm. absolute pressure. Selected fractions were analyzed by infrared spectrometry with the following results:

Table II

| | Percent v. Ohd | Percent p-xylene | Percent m-xylene |
|---|---|---|---|
| Cut #1 | 0–5 | 60.5±1.0 | 39.6±0.5 |
| Cut #5 | 20–25 | 54.0±1.0 | 46.8±0.5 |

Comparison of Tables I and II demonstrate the greatly improved separation achieved with benzyl alcohol (Table I) in comparison with distilling without benzyl alcohol being present.

EXAMPLE III

The procedure set forth in Example I is repeated using 50% v. of phenol instead of benzyl alcohol. There is no improvement in separation over that observed in Example II where no separating agent was employed.

EXAMPLE IV

The procedure set forth in Example I is repeated using 50% v. of aniline instead of benzyl alcohol. There is no improvement in separation over that observed in Example II where no separating agent was employed.

EXAMPLE V

The procedure set forth in Example I is repeated using 50% v. of nitrotoluene instead of benzyl alcohol. There is no improvement of separation over that observed in Example II where no separating agent was employed.

EXAMPLE VI

The procedure set forth in Example I is repeated using 50% v. of ethylene glycol instead of benzyl alcohol. There is no improvement in separation over that observed in Example II where no separating agent was employed.

EXAMPLE VII

The distillation set forth in Example II is repeated with the following addition. A volume of benzyl alcohol equal to one-half the charge volume of 50/50 m-/p-xylene is introduced near the top of the column at such a rate that all benzyl alcohol has been introduced by the time 50% of the xylene mixture is distilled. The overhead is an alcohol-free product and is p-xylene of at least 80% purity. Continued distillation will separate m-xylene of at least 80% purity from the benzyl alcohol in the pot.

It is readily apparent from the foregoing examples that of the various solvents tested, all of which are, according to the prior art, most suited for the separation of pure aromatic hydrocarbons, including xylene, from various mixtures containing same, only benzyl alcohol works for the purpose of separating p-xylene and m-xylene. It is also apparent that benzyl alcohol makes an effective extractive solvent for separation by extractive distillation of p-xylene from m-xylene.

In carrying out the invention in its more specific aspects, commercial mixtures of m- and p-xylenes consisting of between about 40 to 80% by volume of m-xylene and 20 to 60% by volume of p-xylene may be used. Actually, this invention finds utility in treating any mixture of m-xylene and p-xylene containing economically recoverable quantities of p-xylene, i.e., those mixtures containing at least about 5% by volume of p-xylene with the balance of the composition being predominantly m-xylene and higher-boiling isomers or homologues thereof. The proportions of benzyl alcohol used with the xylene mixture depend somewhat on the amount of recoverable p-xylene present. For treating all mixtures, at least about 0.25 volume of benzyl alcohol is used for each volume of xylene mixture. The upper limit of about 3.0 volume of benzyl alcohol per volume of xylene mixture represents a satisfactory maximum although larger ratios may be used. The preferred volume ratio of benzyl alcohol to xylene mixture is 0.5–2.0 to 1.0.

The conditions of treatment are those applied to most fractional distillations. A distillation unit, having at least ten theoretical plates efficiency and adaptable to vacuum operation, should be used and reflux ratios of about 1/1 to 100/1 are applied. The distillation is conducted at between about 760 and 5 mm. Hg pressure. The distillate fractions richer in p-xylene are collected and a residue richer in m-xylene is recovered. The distillation is carried out until overhead fractions having the desired purity of p-xylene are recovered. By using greater reflux ratios, i.e., in the order of 10/1 to 100/1, and increasing the tower efficiency, overhead fractions of p-xylene having a purity of as high as 98% can be obtained by this process. For most practical commercial operations, the column should be designed to obtain p-xylene purities of about 60 to 75% vol. When extractive distillation is the technique employed, higher purities are more easily obtained, and a p-xylene purity greater than 95% can be obtained with xylene/benzyl alcohol ratios of 0.5–2/1, reflux ratios of 1–25/1, and theoretical plates in the ranges of 10–100. Any of the known extractive distillation processes may be applied.

For example, the process as applied in an extractive distillation may be carried out in a conventional manner, wherein benzyl alcohol is introduced into the top of a distillation column and allowed to pass downwardly therethrough as the mixed vapors of xylenes ascend the column. Any of the various types of known packed and bubble-plate columns may be used. The benzyl alcohol in this procedure scrubs the xylene vapors in an enriching zone and forms a fat solvent containing increased concentrations of m-xylene. The fat solvent is further stripped of any small quantities of p-xylene by passage to a stripping zone located in the lower portion of the column through contact with ascending xylene feed mixture, whereby it is further enriched with m-xylene. The enriched p-xylene overhead is recovered at the top of the column.

The invention may be illustrated by reference to the accompanying drawing in which an embodiment of the invention is schematically represented. A feed mixture of m-xylene and p-xylene is introduced into distillation column 10 through line 12, where it is vaporized by heat supplied by reboiler 14. Benzyl alcohol is introduced near the top of column 10 through line 16 and flows downwardly countercurrently to the rising vapors. The overhead, comprising a major portion of p-xylene, is withdrawn from column 10 through line 18, passed through condenser 20, a portion returned to column 10 through line 22 as reflux, and a portion recovered through line 24 for further use and/or processing. The residue comprising benzyl alcohol containing a major portion of m-xylene is withdrawn from column 10 though line 26 for further processing.

The process of extractive distillation as applied to the instant invention may be carried out either adiabatically or isothermally. In conducting the process isothermally, the stripping and enriching zones are operated at substantially the same temperature. Also, either reduced or elevated pressures may be applied to this type of operation. The preferred ratios of reflux to take-off at the still-head are between about 2:1 to 4:1. Because the technique of extractive distillation is well known, it is considered unnecessary to supply additional details of the treatment.

The benzyl alcohol is easily recovered from the residual fraction by steam distillation. In this operation, water is added in amounts up to 60% v. and the benzyl alcohol distills off as an azeotrope with water (B.P. 99.9° C., containing 91% water), leaving the purified m-xylene behind. The recovered benzyl alcohol is recycled to the initial distillation. Alternately, m-xylene (B.P. 139.1° C.) may be distilled from the benzyl alcohol (B.P. 205.8° C.).

The xylene mixtures that can be treated in accordance with this invention may come from synthetic sources, i.e., through alkylation, from coal-tar fractions, or as by-products from reforming operations. One reformed product known in the art as BTX, comprising a mixture of benzene, toluene and xylenes, constitutes a source of a xylene which, after fractionation to obtain a xylene-containing cut, can be used as the feed material for the instant process. The steps applied in the separation of an eutectic mixture of p-xylene and m-xylene, and the techniques applied in fractional crystallization, are known in the art, e.g., Petroleum Refiner, vol. 37, No. 11, November 1958, p. 195, and ibid, vol. 32, No. 4, April 1953, p. 155. To accomplish this step in the process, it is only necessary to cool the xylenes mixture to the crystallization point, or below, and mechanically separate the crystals.

The embodiments of the invention in which an exclusive property or privilege is claimed are defined as follows:

1. The process of separating p-xylene and m-xylene which comprises subjecting a mixture consisting essentially of same to distillation in the presence of benzyl alcohol and recovering an overhead containing a major portion of p-xylene and a residue of benzyl alcohol containing a major portion of m-xylene.

2. The process in accordance with claim 1 in which the xylenes charged comprise an eutectic mixture from fractional crystallization comprising about 11% p-xylene and about 89% m-xylene, and the overhead product comprising substantially increased concentrations of p-xylene is subjected to fractional crystallization to recover improved yields of p-xylene.

3. The process of separating p-xylene and m-xylene which comprises subjecting a mixture consisting essentially of same to extractive distillation in a fractionating column countercurrently to a descending liquid stream of benzyl alcohol, and recovering an overhead containing a major portion of p-xylene and a residue of benzyl alcohol containing a major portion of m-xylene.

4. The process in accordance with claim 3 in which the mixture of m-xylene and p-xylene contains between about 5 and 60 volume percent of p-xylene and 40 to 95 volume percent of m-xylene.

5. The process in accordance with claim 3 in which the overhead fraction containing a major portion of p-xylene is subjected to fractional crystallization to recover pure p-xylene.

6. The process in accordance with claim 3 in which the amount of said benzyl alcohol is between about 0.25 and 3 volumes based on the total volume of said mixture of xylenes.

7. The process in accordance with claim 3 in which a xylene to benzyl alcohol ratio of between about 0.5/1 to 2/1 and reflux ratios of 1/1 to 25/1 are employed to produce an overhead fraction containing a major portion of p-xylene, and said overhead fraction is subjected to fractional crystallization to recover substantially pure p-xylene therefrom.

8. The process of separating mixtures containing between about 5% to 60% by volume of p-xylene and 40% to 95% by volume of m-xylene into a fraction rich in p-xylene and a fraction rich in m-xylene which comprises subjecting said mixture to distillation in the presence of between about 0.25 and 3.0 volume of benzyl alcohol per volume of said mixture and recovering an overhead containing a major portion of p-xylene and a residue of benzyl alcohol containing a major portion of m-xylene.

9. The process in accordance with claim 8 in which said mixture comprises an eutectic mixture composed of about 11% by volume of p-xylene and about 89% by volume of m-xylene from fractional crystallization and said overhead fraction is subjected to fractional crystallization to recover improved yields of p-xylene.

10. The process of separating mixtures containing about 5% to 60% by volume of p-xylene and 40% to 95% by volume of m-xylene into a fraction rich in p-xylene and a fraction rich in m-xylene which comprises subjecting said mixture to extractive distillation in a fractionating column, countercurrently to a descending liquid stream of benzyl alcohol using xylene/benzyl alcohol ratios of 0.5/1 to 2/1 and reflux ratios of about 1/1 to 25/1, and recovering an overhead containing a major portion of p-xylene and a residue of benzyl alcohol containing a major portion of m-xylene.

11. The process of separating p-xylene and m-xylene from mixtures consisting essentially of same which comprises subjecting said mixture to distillation in the presence of benzyl alcohol, recovering an overhead containing a major portion of p-xylene and a residue of benzyl alcohol containing a major portion of m-xylene, subjecting said residue to a fractional crystallization to form separate fractions of purified p-xylene and an eutectic mixture comprising about 11% p-xylene and about 89% m-xylene, recycling said eutetic mixture to said distillation and subjecting said overhead fraction to fractional crystallization to recover substantially pure p-xylene therefrom.

References Cited in the file of this patent
UNITED STATES PATENTS

| | | |
|---|---|---|
| 2,357,028 | Shiras et al. | Aug. 29, 1944 |
| 2,366,570 | Souders et al. | Jan. 2, 1945 |
| 2,763,604 | Dorsey et al. | Sept. 18, 1956 |
| 2,799,629 | Clough et al. | July 16, 1957 |
| 2,824,147 | Coats et al. | Feb. 18, 1958 |

OTHER REFERENCES

"Technique of Organic Chemistry," vol. IV, Distillation, Weissberger, Interscience Publ. Inc., New York, 1951 (pp. 317–341, pp. 338 and 339 specifically relied upon).